(12) United States Patent
Liao et al.

(10) Patent No.: US 11,184,512 B2
(45) Date of Patent: Nov. 23, 2021

(54) FILTER MOUNTING STRUCTURE

(71) Applicant: Shenzhen Velium Precision Optics Co., Ltd., Shenzhen (CN)

(72) Inventors: Xi Liao, Chengdu (CN); Wei Lu, Shenzhen (CN)

(73) Assignee: Shenzhen Velium Precision Optics Co., Ltd., Shenzhen (CN)

( * ) Notice: Subject to any disclaimer, the term of this patent is extended or adjusted under 35 U.S.C. 154(b) by 0 days.

(21) Appl. No.: 16/953,372

(22) Filed: Nov. 20, 2020

(65) Prior Publication Data
US 2021/0337092 A1    Oct. 28, 2021

(30) Foreign Application Priority Data
Apr. 28, 2020    (CN) .......................... 202010352203.2

(51) Int. Cl.
*H04N 9/083*    (2006.01)
*H04N 5/225*    (2006.01)
(52) U.S. Cl.
CPC .................................. *H04N 5/2254* (2013.01)
(58) Field of Classification Search
CPC .................................................... H04N 5/2254
See application file for complete search history.

(56) References Cited

U.S. PATENT DOCUMENTS

| 4,684,231 | A  | * | 8/1987 | Athy ...................... | G03B 11/00 |
| | | | | | 359/892 |
| 11,022,773 | B2 | * | 6/2021 | Clark ..................... | G03B 17/14 |
| 2018/0052332 | A1 | * | 2/2018 | Meng ................... | G03B 17/565 |
| 2020/0018918 | A1 | * | 1/2020 | Clark ..................... | G03B 17/14 |
| 2020/0019043 | A1 | * | 1/2020 | Clark ..................... | G02B 7/006 |

* cited by examiner

*Primary Examiner* — Gary C Vieaux

(57) ABSTRACT

The present disclosure provides a filter mounting structure, which includes a lens connecting pad and a first filter frame. The lens connecting pad is provided with a rotation adjusting ring and a mounting ring. The mounting ring and the rotation adjusting ring form a fastening connection therebetween. The mounting ring is provided with a limiting groove. The first filter frame is provided with a limiting block. The first filter frame is attracted on the mounting ring. The limiting block is received in the limiting groove. The rotation adjusting ring rotates to drive the mounting ring to rotate, and the mounting ring rotates to drive the first filter frame to rotate. The filter mounting structure further includes a second filter frame movably attracted to an end of the first filter frame away from the mounting ring, the second filter frame is rotatable relative to the first filter frame.

9 Claims, 8 Drawing Sheets

FILTER MOUNTING STRUCTURE

CROSS REFERENCE TO RELATED APPLICATIONS

This application claims priority to Chinese Patent Application No. 202010352203.2, filed on Apr. 28, 2020, which is hereby incorporated by reference herein as if set forth in its entirety.

BACKGROUND

1. Technical Field

The present disclosure relates to the field of photographic and camera equipment, and particularly to a filter mounting structure.

2. Description of Related Art

In the process of photographing photos and videos, a filter can be added in front of a lens to obtain a better photographing effect. As the requirements of a user on the photographing effect become higher and higher, a single filter cannot meet the photographing requirements of the user, and the user often needs to mount two or more filters in front of the lens to perform photographing.

There are two types of mounting structures for two filters on the current market.

The first one: The first filter is fixedly connected to the lens, the second filter is movably connected to the first filter. The first filter cannot be rotated relative to the lens, and the user can only rotate the second filter, which cannot meet the requirement of the user on the rotation of the first filter.

The second one: The first filter is movably connected to the lens, and the first filter can be rotated relative to the lens. The second filter is movably connected to the first filter. However, the rotation of the second filter can drive the first lens to rotate, which cannot meet the requirement that the user independently controls the rotation of the first filter or the second filter.

BRIEF DESCRIPTION OF THE DRAWINGS

In order to more clearly illustrate the technical solutions in this embodiment disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objectives, technical solutions, and advantages of the present disclosure clearer, the present disclosure will be further described in detail below with reference to the drawings and embodiments. It should be understood that, the embodiments described herein are only for explaining the present disclosure and are not intended to limit the present disclosure.

Figure 1:
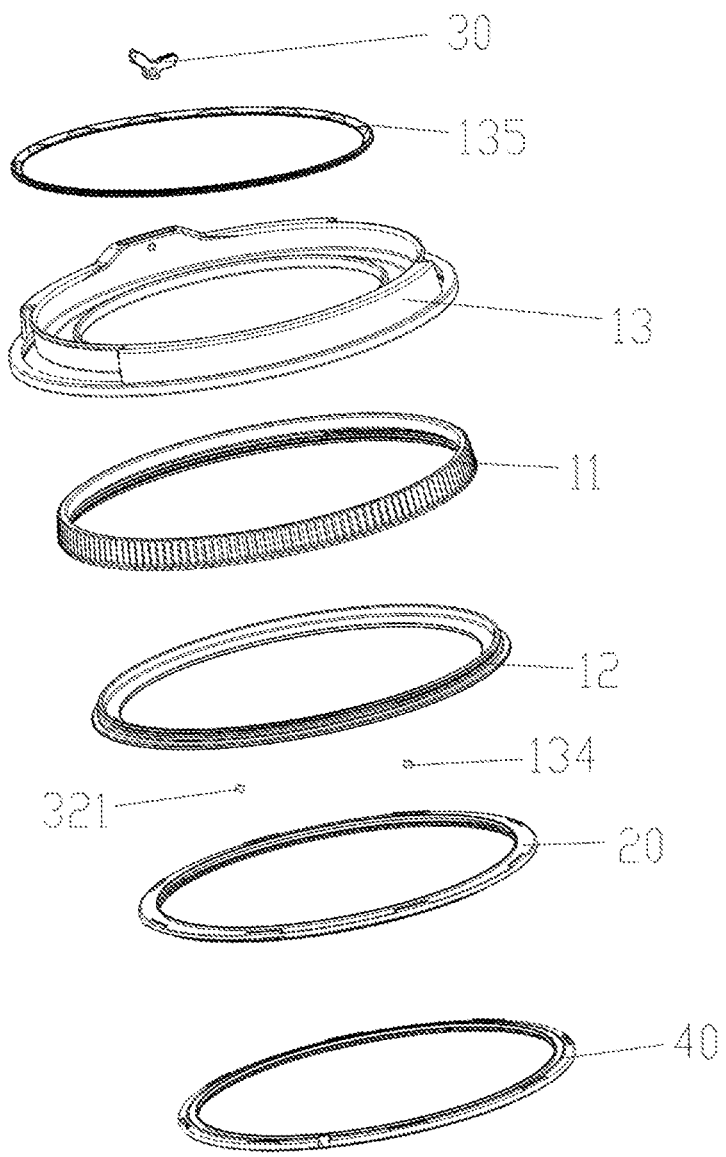
FIG. 1 is an exploded view of a filter mounting structure according to the present disclosure.
Figure 2:
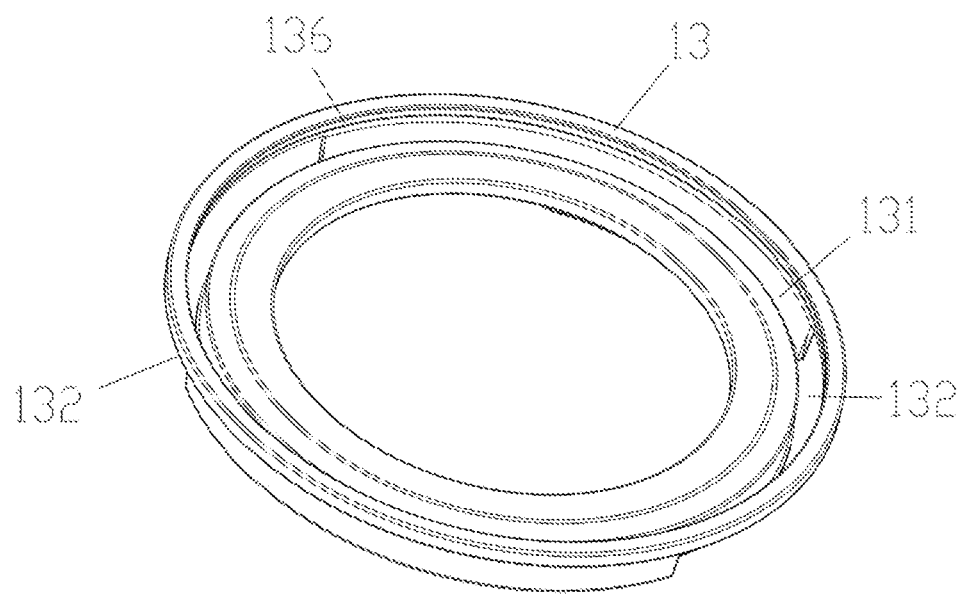
FIG. 2 is a partial perspective view of a housing of a filter mounting structure of the present disclosure.
Figure 3:
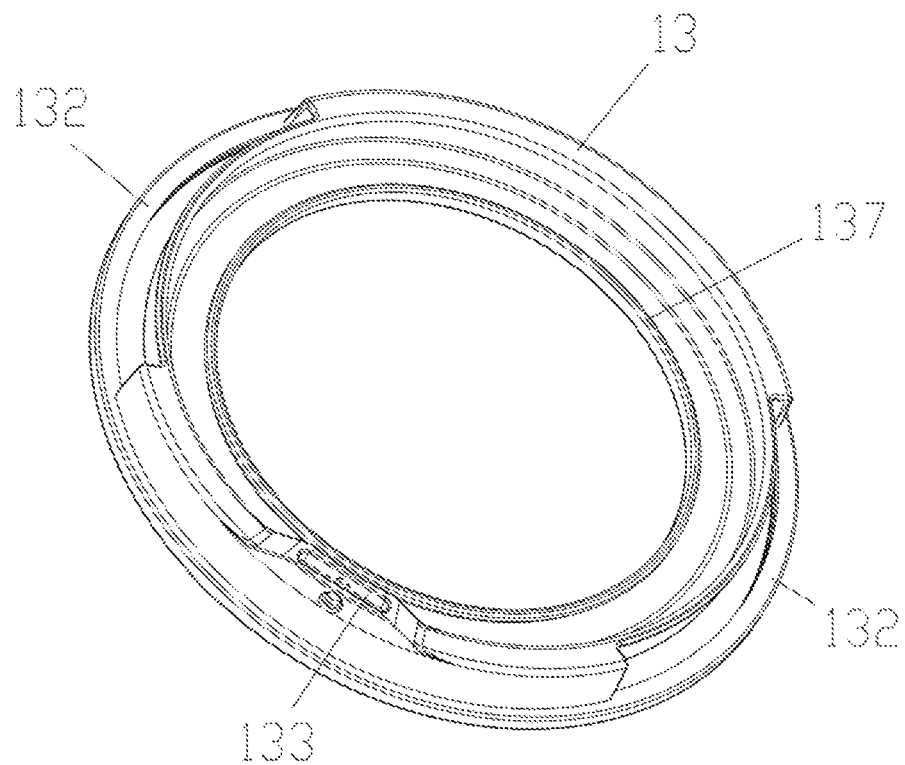
FIG. 3 is another partial perspective view of a housing of a filter mounting structure of the present disclosure.
Figure 4:
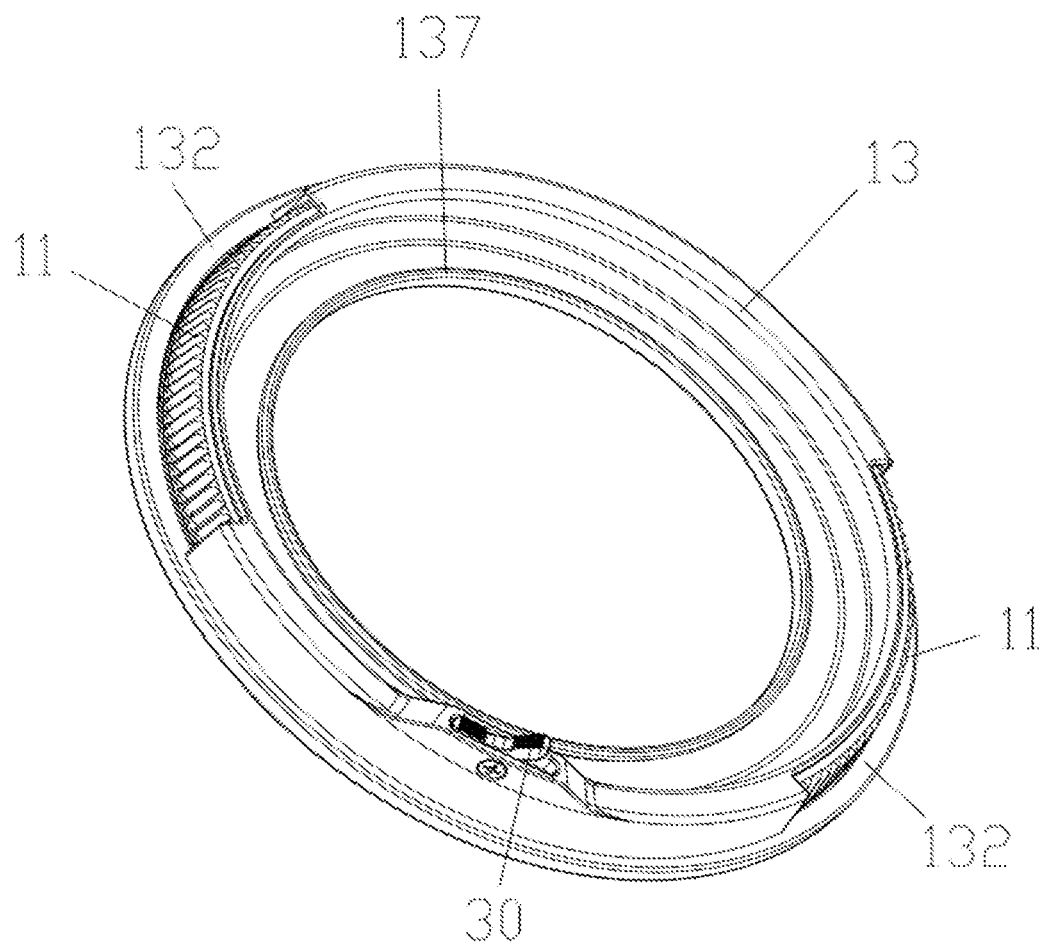
FIG. 4 is a perspective view of a filter mounting structure according to the present disclosure.
Figure 5:
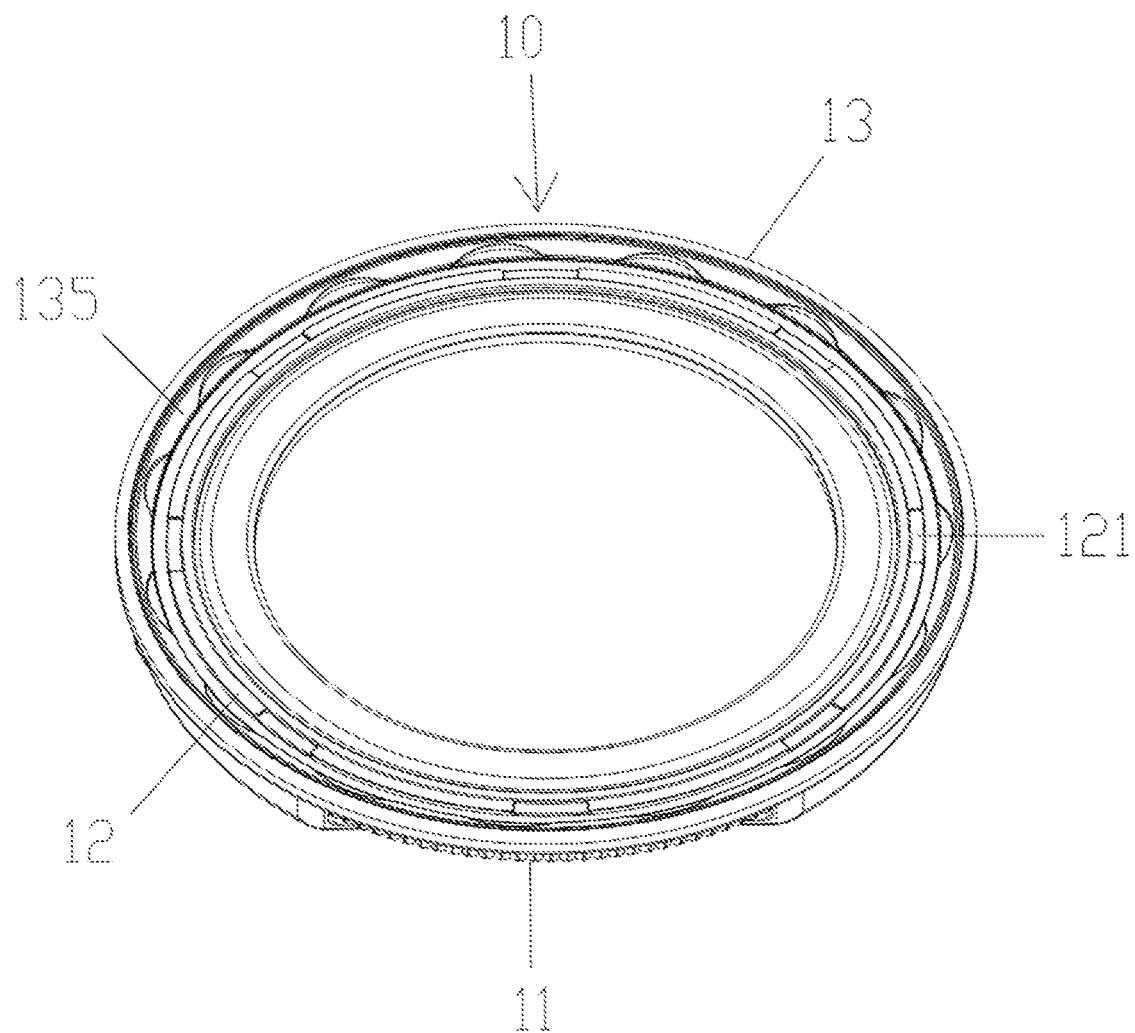
FIG. 5 is a perspective view of a lens connecting pad of a filter mounting structure according to the present disclosure.
Figure 6:
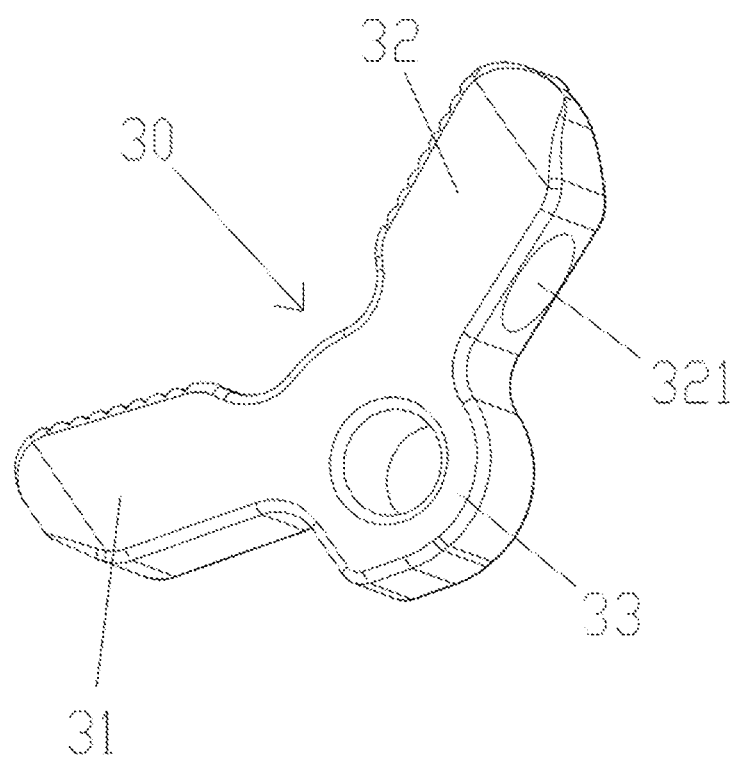
FIG. 6 is a perspective view of a limiting plate of a filter mounting structure according to the present disclosure.
Figure 7:
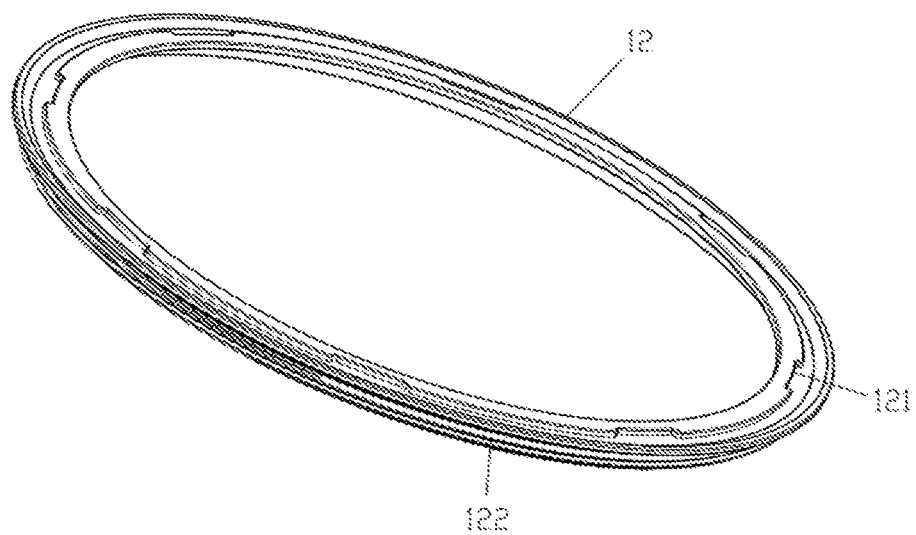
FIG. 7 is a perspective view of a mounting ring of a filter mounting structure according to the present disclosure.
Figure 8:
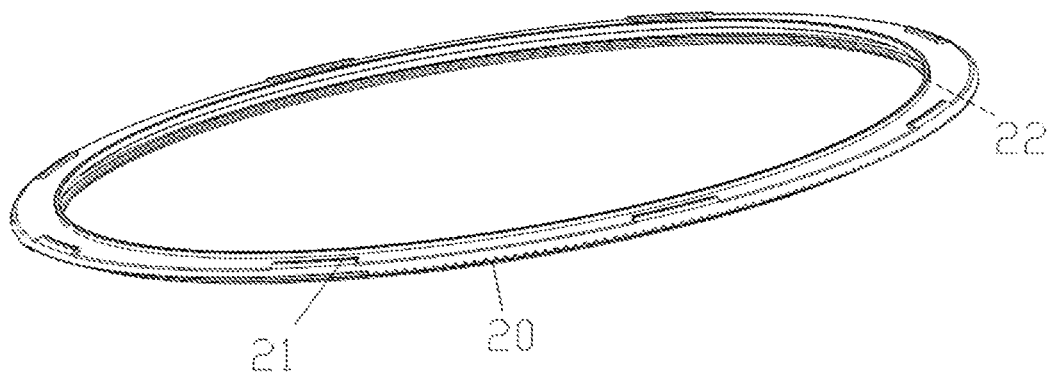
FIG. 8 is a perspective view of a first filter frame of a filter mounting structure of the present disclosure.

Referring to FIGS. 1 to 8, the present disclosure provides a filter mounting structure including a lens connecting pad 10 and a first filter frame 20. The lens connecting pad 10 is provided with a rotation adjusting ring 11 and a mounting ring 12. The mounting ring 12 and the rotation adjusting ring 11 form a fastening connection therebetween. The mounting ring 12 is provided with a limiting groove 121. The first filter frame 20 is provided with a limiting block 21. The first filter frame 20 is attracted on the mounting ring 12. The limiting block 21 is received in the limiting groove 121. The rotation adjusting ring 11 rotates to drive the mounting ring 12 to rotate, and the mounting ring 12 rotates to drive the first filter frame 20 to rotate.

In the present embodiment, the rotation adjusting ring 11 can rotate relative to the lens connecting pad 10. The mounting ring 12 and the rotation adjusting ring 11 form a fastening connection therebetween, and the rotation adjusting ring 11 rotates to drive the mounting ring 12 to rotate. The first filter frame 20 is provided with a magnet, and the mounting ring 12 is made of ferrous materials. The first filter frame 20 is attracted to the mounting ring 12 by magnetic attraction. In this case, the limiting block 21 is received in the limiting groove 121, and the first filter frame 20 is limited such that the first filter frame 20 cannot rotate relative to the mounting ring 12.

Further, the mounting ring 12 is further provided with a mounting portion 122, which is received in the rotation adjusting ring 11 and is threadedly connected to the rotation adjusting ring 11.

In the present embodiment, the mounting portion 122 is threadedly connected to the rotation adjusting ring 11. During assembly, the mounting portion 122 is screwed into the rotation adjusting ring 11, so that a fastening connection is formed between the mounting ring 12 and the rotation adjusting ring 11.

Further, the first filter frame 20 is further provided with a first positioning ring 22, and the first positioning ring 22 is received in the mounting ring 12 and abuts against the mounting ring 12.

In the present embodiment, the first positioning ring 22 is received in the mounting ring 12 and abuts against the mounting ring 12, and the first filter frame 20 is limited such that the first filter frame 20 cannot slide relative to the mounting ring 12.

Further, the lens connecting pad 10 further includes a housing 13. The housing 13 is provided with a first mounting groove 131. The rotation adjusting ring 11 and the mounting ring 12 are movably received in the first mounting groove 131, and the rotation adjusting ring 11 is located between the housing 13 and the mounting ring 12.

In the present embodiment, the rotation adjusting ring 11 and the mounting ring 12 are movably received in the first mounting groove 131, and both the rotation adjusting ring 11 and the mounting ring 12 can rotate relative to the housing 13. The housing 13 is further provided with an annular positioning plate 137 through which the lens connecting pad 10 can be mounted on an external lens.

Further, the housing 13 is further provided with at least one adjusting groove 132, which is in communication with the first mounting groove 131 so that the rotation adjusting ring 11 is partially exposed from the housing 13.

In the present embodiment, the number of the adjusting grooves 132 is two, and the rotation adjusting ring 11 can be rotated by the adjusting grooves 132.

Further, the filter mounting structure further includes a limiting plate 30. The housing 13 is further provided with a second mounting groove 133 in communication with the first mounting groove 131. The limiting plate 30 is partially received in the second mounting groove 133 and is movably connected to the housing 13, and the limiting plate 30 is rotated to abut against the rotation adjusting ring 11, thereby limiting the rotation of the rotation adjusting ring 11. The limiting plate 30 includes a first portion 31, a second portion 32, and a limiting portion 33. When the limiting plate 30 is rotated to a state that the first portion 31 is received in the second mounting groove 133, the second portion 32 protrudes out of the second mounting groove 133, and the limiting portion 33 abuts against the rotation adjusting ring 11.

In the present embodiment, the limiting plate 30 is movably connected to the housing 13 by a screw extending through the housing 13 and the limiting plate 30. When the rotation of the rotation adjusting ring 11 needs to be limited, the first portion 31 is pressed to rotate the limiting plate 30 until the first portion 31 is received in the second mounting groove 133. In this case, a groove wall of the second mounting groove 133 clamps the first portion 31 so as to limit the rotation of the first portion 31 out of the second mounting groove 133. The limiting portion 33 abuts against the rotation adjusting ring 11, so that the rotation adjusting ring 11 is limited and cannot rotate.

Further, the second portion 32 is provided with a first magnetic element 321, and the housing 13 further includes a second magnetic element 134 fixedly mounted in the second mounting groove 133. When the limiting plate 30 is rotated until the second portion 32 is received in the second mounting groove 133, the first magnetic element 321 and the second magnetic element 134 are attracted together.

In the present embodiment, the second portion 32 is pressed to rotate the limiting plate 30 until the second portion 32 is received in the second mounting groove 133. In this case, the first magnetic element 321 and the second magnetic element 134 are attracted together to limit the rotation of the second portion 32 out of the second mounting groove 133. The limiting portion 33 is spaced apart from the rotation adjusting ring 11, and the rotation adjusting ring 11 can rotate relative to the housing 13.

Further, the housing 13 further includes a pressing ring 135. The housing 13 is further provided with a positioning portion 136. The positioning portion 136 is disposed above the mounting ring 12. The pressing ring 135 is threadedly connected to the positioning portion 136, and the pressing ring 135 abuts against the mounting ring 12.

In the present embodiment, the pressing ring 135 is threadedly connected to the positioning portion 136 so that the pressing ring 135 is fixedly connected to the housing 13. The pressing ring 135 is threadedly connected to the positioning portion 136 so that the mounting of the pressing ring 135 is facilitated. The pressing ring 135 abuts against the mounting ring 12, thereby limiting the position of the mounting ring 12 and preventing the mounting ring 12 from being disengaged from the first mounting groove 131.

Further, the filter mounting structure further includes a second filter frame 40. The second filter frame 40 is movably attracted to an end of the first filter frame 20 away from the mounting ring 12, and the second filter frame 40 can rotate relative to the first filter frame 20.

In the present embodiment, both the first filter frame 20 and the second filter frame 40 is capable of mounting a lens for use. The second filter frame 40 is provided with a magnet, the first filter frame 20 is also provided with a magnet, and the second filter frame 40 is movably attracted to an end of the first filter frame 20 away from the mounting ring 12 by magnetic force. When in use, if the first filter frame 20 is required to be rotated, the second portion 32 is pressed to rotate the limiting plate 30 until the second portion 32 is received in the second mounting groove 133, and the first filter frame 20 is driven to rotate by rotating the rotation adjusting ring 11. If the second filter frame 40 is required to be rotated without rotating the first filter frame 20, the first portion 31 is pressed to rotate the limiting plate 30 until the first portion 31 is received in the second mounting groove 133. At this time, the second filter frame 40 is rotated. Since the rotation adjusting ring 11 is limited and cannot be rotated, the first filter frame 20 is also limited and cannot be rotated.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A filter mounting structure, characterized in that the filter mounting structure comprises a lens connecting pad (10) and a first filter frame (20), the lens connecting pad (10) is provided with a rotation adjusting ring (11) and a mounting ring (12), the mounting ring (12) and the rotation adjusting ring (11) form a fastening connection therebetween, the mounting ring (12) is provided with a limiting groove (121), the first filter frame (20) is provided with a limiting block (21), the first filter frame (20) is attracted on the mounting ring (12), the limiting block (21) is received in the limiting groove (121), the rotation adjusting ring (11) rotates to drive the mounting ring (12) to rotate, and the mounting ring (12) rotates to drive the first filter frame (20) to rotate; wherein the filter mounting structure further comprises a second filter frame (40) movably attracted to an end of the first filter frame (20) away from the mounting ring (12), the second filter frame (40) is rotatable relative to the first filter frame (20).

2. The filter mounting structure according to claim 1, wherein the mounting ring (12) is further provided with a mounting portion (122) received in the rotation adjusting ring (11) and threadedly connected to the rotation adjusting ring (11).

3. The filter mounting structure according to claim 1, wherein the first filter frame (20) is further provided with a first positioning ring (22) received in the mounting ring (12).

4. The filter mounting structure according to claim 1, wherein the lens connecting pad (10) further comprises a housing (13), the housing (13) is provided with a first mounting groove (131), the rotation adjusting ring (11) and the mounting ring (12) are movably received in the first mounting groove (131), and the rotation adjusting ring (11) is located between the housing (13) and the mounting ring (12).

5. The filter mounting structure according to claim 4, wherein the housing (13) is further provided with at least one adjusting groove (132), the adjusting groove (132) is in communication with the first mounting groove (131) so that the rotation adjusting ring (11) is partially exposed from the housing (13).

6. The filter mounting structure according to claim 4, wherein the housing (13) further comprises a pressing ring (135), the housing (13) is further provided with a positioning portion (136), the positioning portion (136) is disposed above the mounting ring (12), the pressing ring (135) is threadedly connected to the positioning portion (136), and the pressing ring (135) abuts against the mounting ring (12).

7. The filter mounting structure according to claim 4, wherein the filter mounting structure further comprises a limiting plate (30), the housing (13) is further provided with a second mounting groove (133) in communication with the first mounting groove (131), the limiting plate (30) is partially received in the second mounting groove (133) and is movably connected to the housing (13), and the limiting plate (30) is rotated to abut against the rotation adjusting ring (11) so that a rotation of the rotation adjusting ring (11) is limited.

8. The filter mounting structure according to claim 7, wherein the limiting plate (30) comprises a first portion (31), a second portion (32), and a limiting portion (33), when the limiting plate (30) is rotated to a state that the first portion (31) is received in the second mounting groove (133), the second portion (32) protrudes out of the second mounting groove (133), and the limiting portion (33) abuts against the rotation adjusting ring (11).

9. The filter mounting structure according to claim 8, wherein the second portion (32) is provided with a first magnetic element (321), the housing (13) further comprises a second magnetic element (134) fixedly mounted in the second mounting groove (133), the first magnetic element (321) and the second magnetic element (134) are attracted together when the limiting plate (30) is rotated to a state that the second portion (32) is received in the second mounting groove (133).

* * * * *